Feb. 7, 1928.
M. R. HULL
1,658,124
FERRULE PIN
Filed July 15, 1924
Fig. 1.
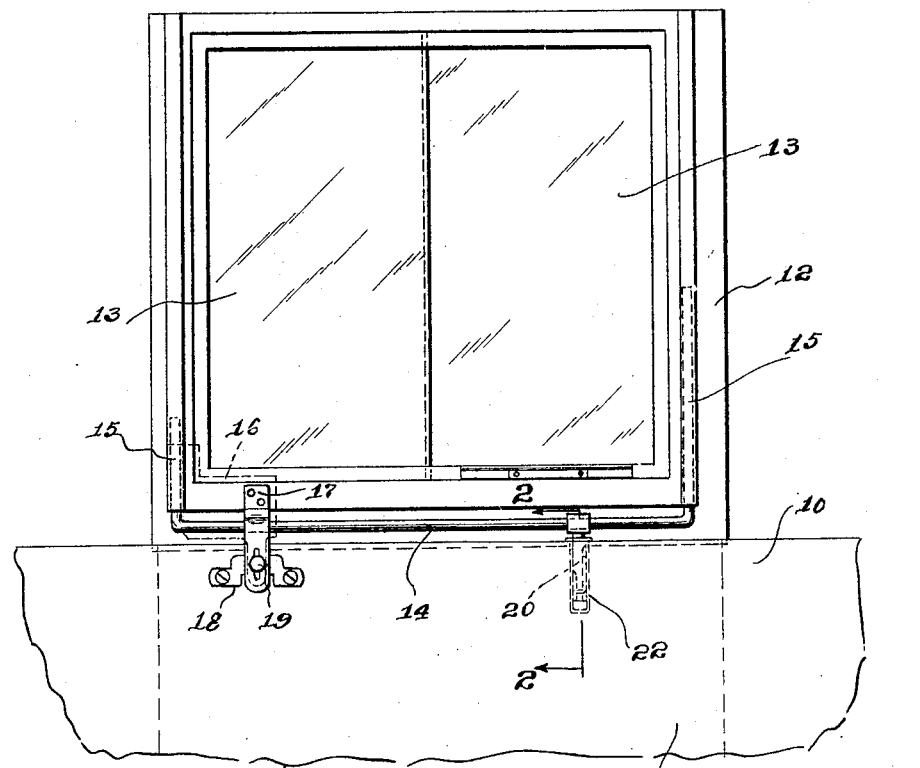
Fig. 5.
Fig. 3.
Fig. 4.
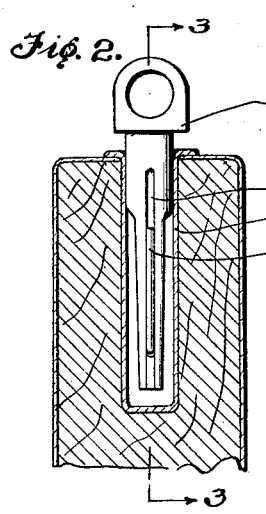
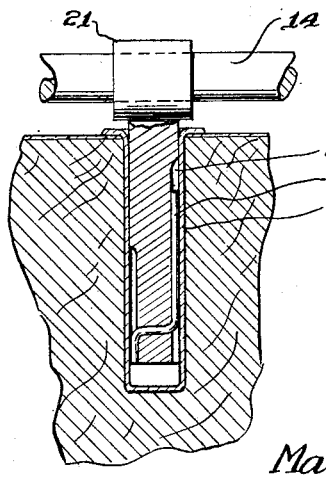
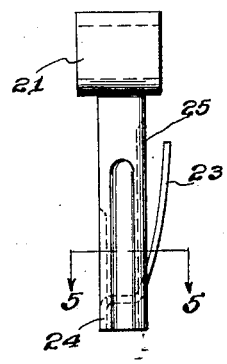
Fig. 2.
Inventor
Matthew R. Hull
By
Attorney Patented Feb. 7, 1928.

1,658,124

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION OF INDIANA.

FERRULE PIN.

Application filed July 15, 1924. Serial No. 726,220.

My said invention relates to a ferrule pin for use in holding demountable door sections on the permanent door of an automobile or similar vehicle, said ferrule pin in the embodiment here shown being designed for attachment to a horizontal bar on the demountable door section as for example the horizontal portion of a resilient door connector.

The principal object of my improved device is to prevent such a ferrule pin from wobbling or rattling in the housing into which it is driven.

Another object of the invention is to provide a ferrule pin which shall serve to prevent the upper door section from bouncing upward and getting out of line with the lower door section.

Referring to the accompanying drawings, which are made a part hereof and on which similar reference characters indicate similar parts, Figure 1 is a side elevation of an automobile door with my device applied thereto, Figure 2, a section on line 2—2 of Figure 1, Figure 3, a section at right angles to Figure 2 on line 3—3 thereof, Figure 4, an elevation of my improved device, and Figure 5, a section on line 5—5 thereof.

In the drawings reference character 10 indicates a portion of the body of an automobile having a swinging permanent door section 11. A demountable section 12 is superposed on the permanent section and may be secured thereto in various ways. This demountable section has a pair of panels of glass 13 forming a transparent window and is provided with a resilient connector in the form of a horizontal rod 14 having upwardly bent sections 15 so related to the door sections as to tilt the upper section slightly forward relatively to the lower section thereby holding it firmly against the body to prevent rattling and access of dust and cold air.

A plate indicated in dotted lines at 16 is secured to the outer side of the door and an upright strip of metal 17 to the inner side by rivets passing through said parts 16 and 17. A strip or bar of metal 18 is secured to the permanent door section and a bolt or screw 19 connects the parts 17 and 18 adjustably as more fully described in my copending application No. 726,221 of even date herewith.

The parts just described are located adjacent the rear edge of the door and at the front edge the bolt which constitutes the feature herein claimed is indicated at 20. Said bolt has a head 21 at its upper end with an eye to receive the rod-like member 14. A socket member or housing 22 is secured in a recess in the upper door section and the body of bolt 20 is forced into said socket member. As shown in Figure 5 said bolt may be flattened throughout the greater portion of its length.

A spring 23 extends in the direction of greatest width of the bolt directly through an aperture in the bolt and is bent downward at 24 to hold the spring in place, the bent portion lying in a slot in the side of the bolt. At the other side the spring extends upward as shown in Figures 3 and 4 and normally lies in the position of Figure 4 but when the bolt is driven home it is compressed between the socket and the side of the bolt so that it lies approximately as shown in Figure 3 in a slot at 25 directly opposite that containing the part 24. It will be seen that the spring tends to resist withdrawal of the bolt and also tends to prevent rattling, being assisted in this respect by the thick upper end of the bolt and the narrow lower portion. In addition to prevention of rattling the device acts as a lock to hold the upper door section down in position on the lower door section.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention what I claim as new and desire to secure by Letters Patent, is:

1. A ferrule pin comprising a head, a cylindrical portion below the head, a flattened portion below the cylindrical portion, and a linear spring having approximately parallel ends adapted to rest in longitudinal grooves in the pin, said spring having a body portion extending through the ferrule pin, substantially as set forth.

2. A ferrule pin comprising a head, a cylindrical portion below the head, a flattened portion below the cylindrical portion, a linear spring having approximately parallel ends adapted to rest in longitudinal grooves in said pin, said spring having a body portion extending through the ferrule pin in a direction parallel to the flat sides thereof, substantially as set forth.

3. A ferrule pin comprising a body portion adapted to fit snugly within a socket, said body portion having longitudinal grooves on opposite sides thereof connected by an aperture through the body portion, and a spring member secured to the body portion by being passed through the aperture and having its ends bent in a position overlying said grooves whereby said ends will be pressed in the grooves when the body portion is inserted in the socket, substantially as set forth.

In witness whereof, I have hereunto set my hand at Connersville, Indiana, this 30th day of June, A. D. nineteen hundred and twenty-four.

MATTHEW R. HULL.